(12) United States Patent
Chirhart et al.

(10) Patent No.: US 9,946,853 B1
(45) Date of Patent: Apr. 17, 2018

(54) TECHNIQUES FOR APPLICATION CODE OBFUSCATION

(71) Applicant: Symantec Corporation, Mountain View, CA (US)

(72) Inventors: Gary Chirhart, Milford, MI (US); Brian T. Witten, Reston, VA (US)

(73) Assignee: Symantec Corporation, Mountain View, CA (US)

( * ) Notice: Subject to any disclaimer, the term of this patent is extended or adjusted under 35 U.S.C. 154(b) by 147 days.

(21) Appl. No.: 14/857,046

(22) Filed: Sep. 17, 2015

(51) Int. Cl.
*H04L 29/00* (2006.01)
*G06F 21/14* (2013.01)
*G06F 11/36* (2006.01)

(52) U.S. Cl.
CPC .......... *G06F 21/14* (2013.01); *G06F 11/3688* (2013.01); *G06F 11/3692* (2013.01); *G06F 2221/0724* (2013.01)

(58) Field of Classification Search
CPC ... G06F 21/14; G06F 11/3688; G06F 11/3692
See application file for complete search history.

(56) References Cited

U.S. PATENT DOCUMENTS

| | | | | |
|---|---|---|---|---|
| 6,668,325 B1* | 12/2003 | Collberg | ................. | G06F 21/14 713/194 |
| 7,587,616 B2* | 9/2009 | Jakubowski | .............. | G06F 8/51 713/189 |
| 8,161,463 B2* | 4/2012 | Johnson | .................. | G06F 21/14 713/190 |
| 9,471,852 B1* | 10/2016 | Feris | ................. | G06F 17/30828 |
| 9,590,808 B2* | 3/2017 | Jiang | ..................... | H04L 9/3226 |
| 2008/0208560 A1* | 8/2008 | Johnson | .................. | G06F 21/14 703/22 |
| 2009/0119515 A1* | 5/2009 | Nicolson | ................. | G06F 21/14 713/190 |
| 2011/0277037 A1* | 11/2011 | Burke | ................. | G06F 21/6245 726/26 |
| 2013/0247193 A1* | 9/2013 | Zaitsev | ................. | G06F 21/552 726/23 |
| 2016/0330219 A1* | 11/2016 | Hasan | ................. | H04L 63/1416 |
| 2016/0342777 A1* | 11/2016 | Sadhasivan | ............. | G06F 21/14 |
| 2017/0132495 A1* | 5/2017 | Feris | .................... | G06K 9/6269 |

\* cited by examiner

*Primary Examiner* — Don Zhao
(74) *Attorney, Agent, or Firm* — Rory D. Rankin; Meyertons, Hood, Kivlin, Kowert & Goetzel, P.C.

(57) ABSTRACT

Techniques for application code obfuscation are disclosed. In one embodiment, the techniques may be realized as a method including receiving application code and testing data associated with the application; automatically generating obfuscated application code from the received application code; automatically testing the obfuscated application code by running the obfuscated application code and inputting at least the recorded inputs from the testing data while recording associated outputs; in response to determining that the associated outputs from automatically testing the obfuscation code do not match the testing data outputs, modifying the obfuscated application code and automatically testing the modified obfuscated application code against the testing data; and, in response to determining that outputs from automatically testing the modified obfuscated application code match the testing data outputs, transmitting the modified obfuscated application code as a successful obfuscation of the application.

18 Claims, 4 Drawing Sheets

TECHNIQUES FOR APPLICATION CODE OBFUSCATION

FIELD OF THE DISCLOSURE

The present disclosure relates generally to application security and, more particularly, to techniques for application code obfuscation.

BACKGROUND OF THE DISCLOSURE

Anti-tampering protection has become increasingly important in the mobile space, as several tools exist to decompile and reverse engineer applications. One approach to combat reverse engineering is to obfuscate the application code and code flow combined with checksum code to detect tampering. After code obfuscation, the application code needs to be retested to ensure that the code transformation has not damaged the application. For a cloud service obfuscator, this retesting will normally require that the customer submit their application and then rerun their tests on the obfuscated application. If any issues are found, the application needs to be resubmitted for obfuscation with notes about what code to avoid obfuscating.

In view of the foregoing, it may be understood that there may be significant problems and shortcomings associated with current techniques for remote obfuscation.

SUMMARY OF THE DISCLOSURE

Techniques for application code obfuscation are disclosed. In one embodiment, the techniques may be realized as a method including receiving application code and testing data associated with the application code, the testing data including records of output results matched to inputs to the application code when run as an application; automatically generating obfuscated application code from the received application code, the obfuscated application code configured to carry out the same functions as the received application code but with reduced transparency to a human attempting to understand the application by reading the obfuscated code; automatically testing the obfuscated application code by running the obfuscated application code and inputting at least the recorded inputs from the testing data while recording associated outputs; in response to determining that the associated outputs from automatically testing the obfuscation code do not match the testing data outputs, modifying the obfuscated application code and automatically testing the modified obfuscated application code against the testing data; and, in response to determining that outputs from automatically testing the modified obfuscated application code match the testing data outputs, transmitting the modified obfuscated application code as a successful obfuscation of the application.

In accordance with other aspects of this embodiment, the method can further include, prior to receiving the testing data, providing instrumentation to the application code for monitoring the application code during testing.

In accordance with other aspects of this embodiment, the method can further include, prior to receiving the testing data, transmitting an instrumentation tool configured to add instrumentation to the application code for monitoring the application code during testing.

In accordance with other aspects of this embodiment, the method can further include receiving second application code and second testing data associated with the second application code; automatically generating second obfuscated application code from the received second application code; automatically testing the second obfuscated application code by running the second obfuscated application code and inputting at least recorded inputs from the second testing data while recording associated outputs; and in response to determining that the associated outputs from automatically testing the second obfuscated application code match the second testing data, transmitting the second obfuscated application code as a successful obfuscation of the second application.

In accordance with other aspects of this embodiment, modifying the obfuscated application code can include selectively identifying a portion of the application code associated with an output that did not match during testing and modifying the identified portion of the application code so that it matches the received application code and is not obfuscated.

In accordance with other aspects of this embodiment, the testing data can include at least one of a creation, deletion, or modification of files present in system memory. Testing the obfuscation code can further include matching all such events included in the testing data with events occurring in a testing environment associated with the running of the obfuscated application code.

In accordance with another embodiment, the techniques may be realized as an article of manufacture including at least one processor readable storage medium and instructions stored on the at least one medium. The instructions may be configured to be readable from the at least one medium by at least one processor and thereby cause the at least one processor to operate so as to carry out any and all of the steps in the above-described method.

In accordance with another embodiment, the techniques may be realized as a system comprising one or more processors communicatively coupled to a network; wherein the one or more processors are configured to carry out any and all of the steps described with respect to any of the above embodiments.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Embodiments of the present disclosure are directed to a cloud-based service that provides tamper protection for developed applications. During the first step of the proposed solution, the customer submits an application for tamper protection to the cloud service. The cloud service then instruments the application with execution profiling code. The profiling code records method inputs and outputs during executing. Additional captured outputs may include created/modified/deleted files as well as any network I/O. The customer then downloads the instrumented application and runs it through their test suite. The profiler captures method input/output data captured during the tests and writes it to a file. The customer uploads the profile data file back to the cloud service. The original application package is now obfuscated by the cloud service. Any modified method names are mapped form original name to obfuscated name. Then, the test profile data is used to rerun the tests against the obfuscated code by passing the same input parameters into the obfuscated functions and verifying that the expected outputs occur. If issues are found for certain methods, those methods can be then be obfuscated in different way or skipped during obfuscation without involving the customer.

Figure 1:
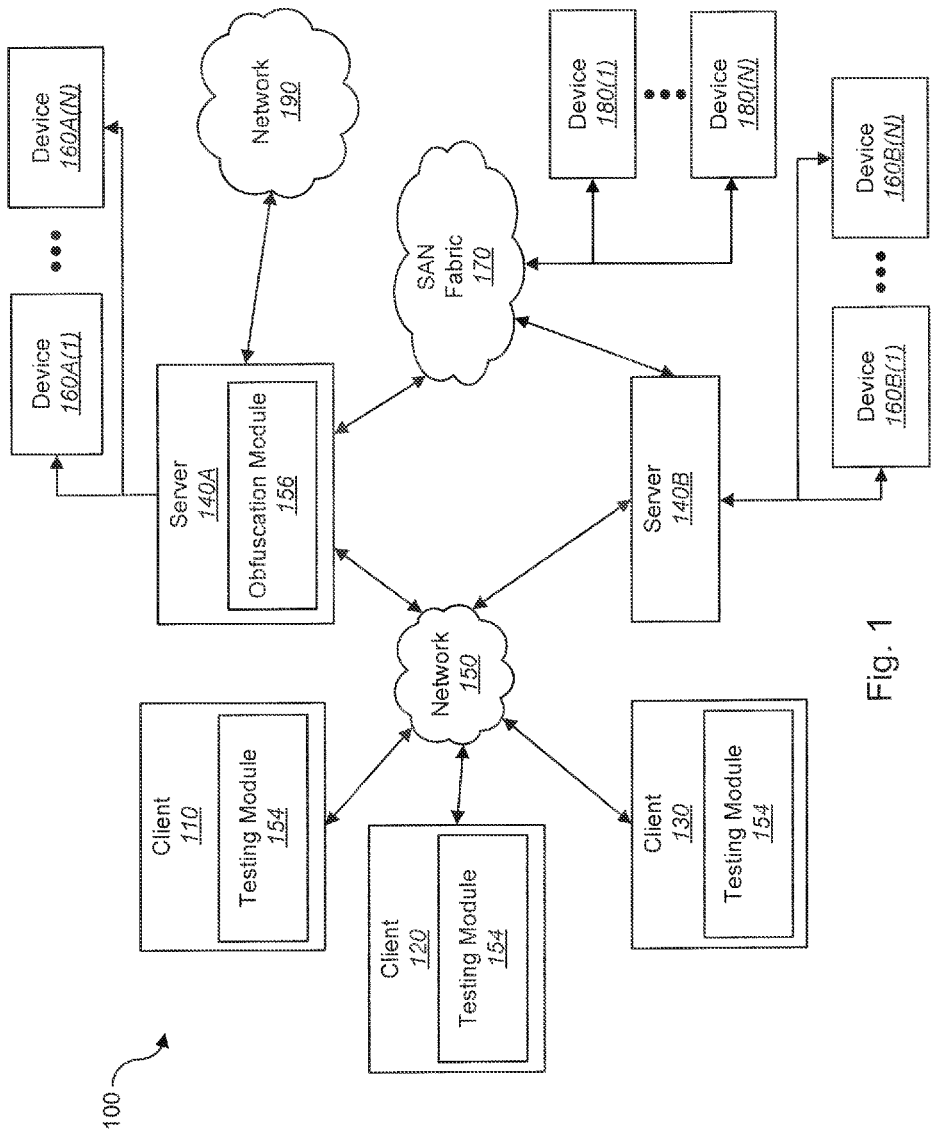
FIG. 1 shows a block diagram depicting a network architecture in accordance with an embodiment of the present disclosure.

FIG. 1 shows a block diagram depicting a network architecture 100 in accordance with an embodiment of the present disclosure. FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
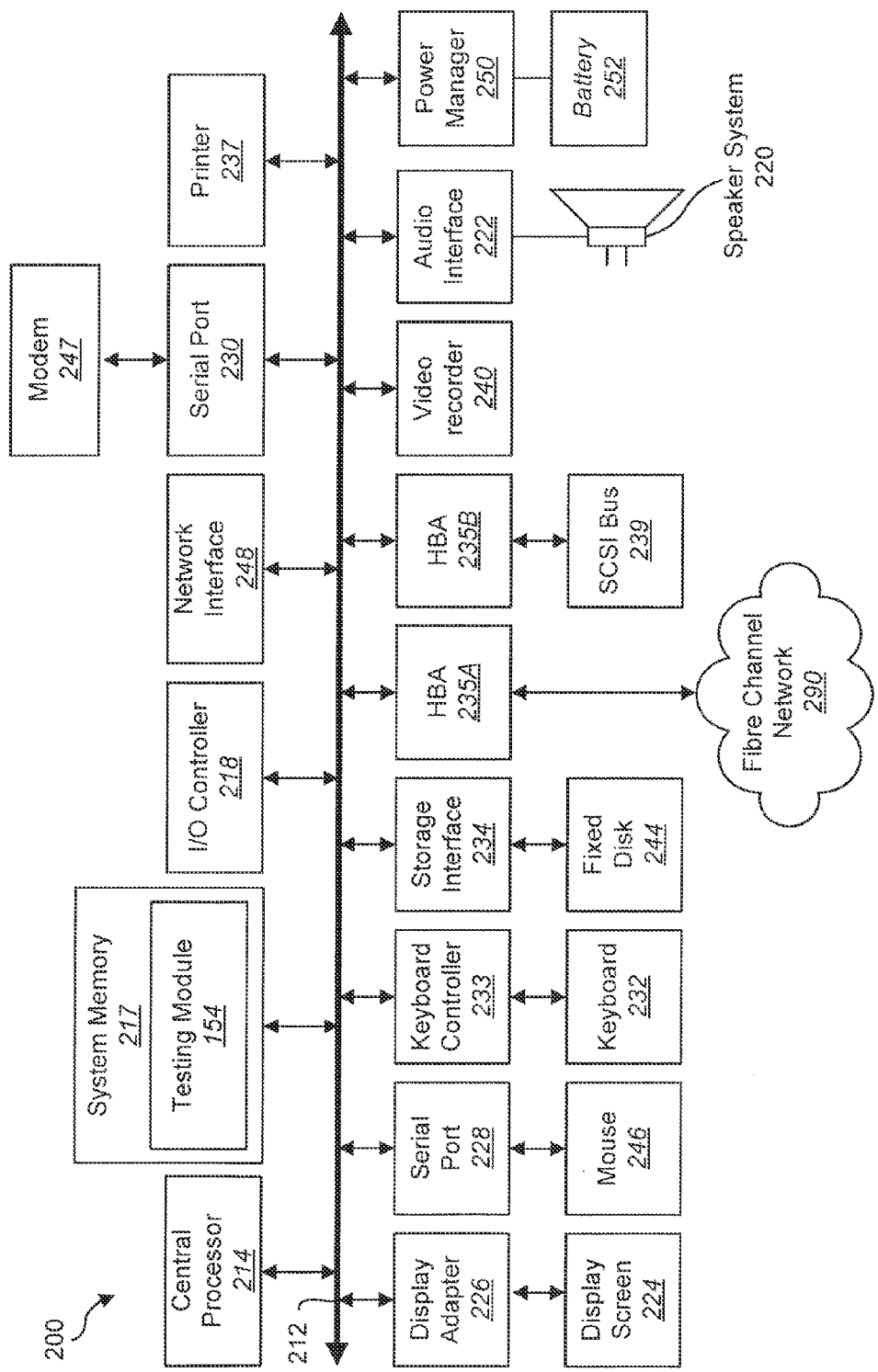
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. Further, storage devices 160A(1)-(N), 160B(1)-(N), and/or 180(1)-(N) may be implemented as part of a multi-tier storage environment.

According to some embodiments, clients 110, 120, and 130 may be smartphones, PDAs, desktop computers, laptop computers, servers, other computers, or other devices coupled via a wireless or wired connection to network 150. Clients 110, 120, and 130 may receive data from user input, a database, a file, a web service, and/or an application programming interface. In some implementations, clients 110, 120, and 130 may specifically be network-capable mobile devices such as smartphones or tablets.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and 130 may contain one or more portions of software for development and evaluation such as, for example, testing module 154. Further, an obfuscation module 156 can reside at a network centric location such as server 140A. For example, server 140A may be a server, a firewall, a gateway, or other network element that may perform one or more actions to support management of system and network security elements. According to some embodiments, network 190 may be an external network (e.g., the Internet) and server 140A may be a gateway or firewall between one or more internal components and clients and the external network. According to some embodiments, analysis and approval of resource references including DLP agent 154 may be implemented as part of a cloud computing environment.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a printer 237 operative to receive data and/or images for printing, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a printer 237, a removable disk unit (e.g., Universal Serial Bus drive), or other storage medium. According to some embodiments, a testing module 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244 or optical disk 242. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
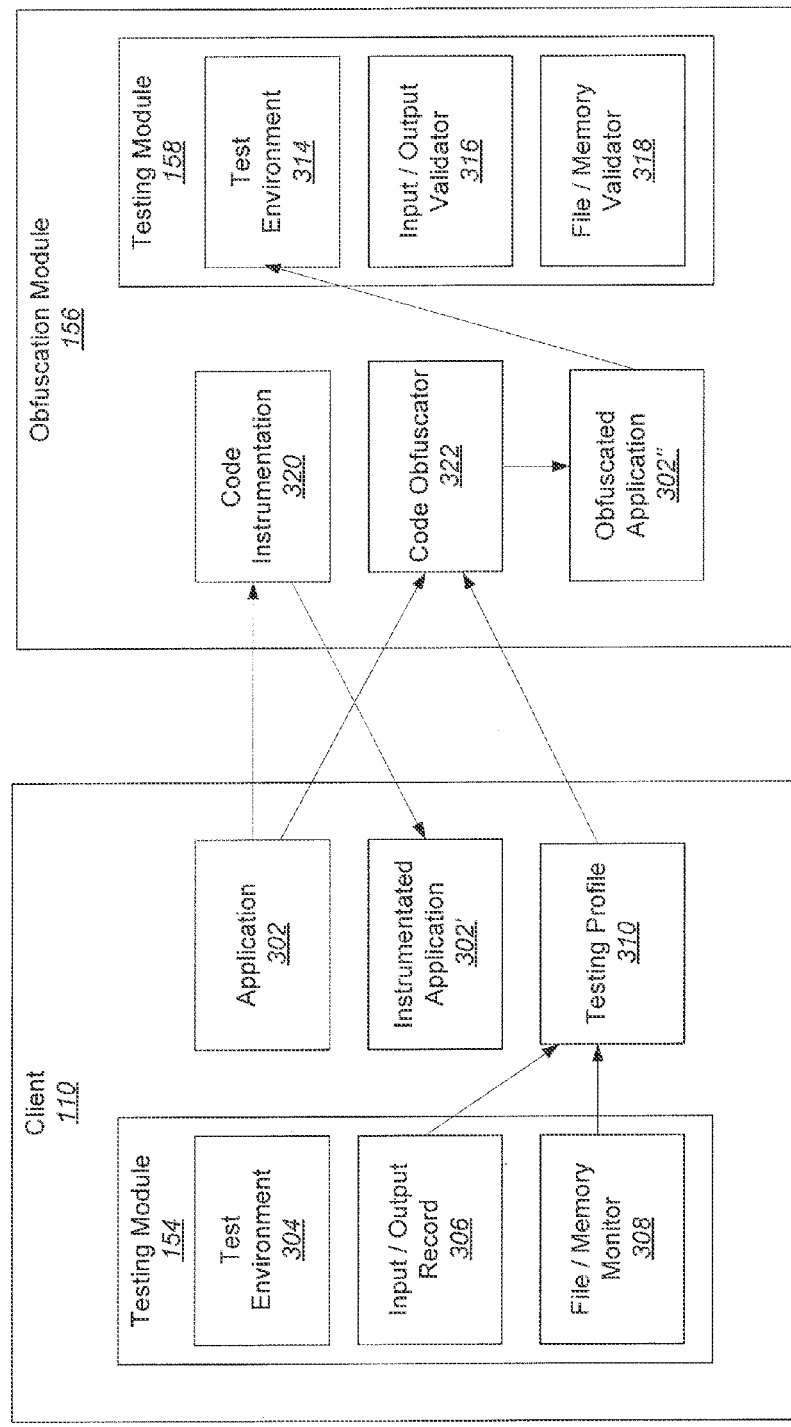
FIG. 3 shows a block diagram illustrating testing and obfuscation modules in accordance with an embodiment of the present disclosure.

FIG. 3 illustrates an example of a client device 110 which includes a testing module 154 and is in network communication with a cloud-based obfuscation module 156. Although earlier shown as residing on a server 140A, it will be understood that the components of the obfuscation module 156 are, in some implementations of the present disclosure, components of a cloud-based software service which may be disposed on any number of machines in network communication and may not be permanently associated with a particular identified server.

The client device 110 includes an application 302 to be obfuscated. In some implementations, the application 302 may be a mobile application intended for consumer use such that the application creator wishes to provide a barrier to reverse engineering.

In some implementations, the client 110 may submit the original application code to the cloud-based module 156, where instrumentation is added to the code to allow for monitoring of various application outputs. The instrumented application 302' is downloaded from the cloud-based service for testing at the client 110. Alternatively, a code instrumentation module 320 may be downloaded to the client 110 and thereinafter used to instrument code for testing and recording results. Where the code instrumentation module 320 is made available (as an application, tool, or other program product) for use by the client 110, the client may instrument and test various application versions using the code instrumentation module 320. The client 110 may further include a testing module 154 which may have a testing environment appropriate 304 for receiving and testing the instrumented application 302'. The testing environment may include, for example, partitioned actual or virtual memory, simulated registries, strictly controlled permissions, and other safeguards to allow for testing of applications without harm to any unrelated components of the system. Upon testing the instrumented application 302', the testing module 154 may generate a record 306 of various inputs fed to the application 302', simulating various user and system interfaces, and the corresponding outputs received from the application 302' (tracked by means of the instrumentation code). Additionally, a file and memory monitor 308 can keep track of the test environment 304 and record any variables that are initialized or manipulated by the application 302' as well as any files that are added, changed, or deleted during the test run.

The testing module 154 need not be strictly automated. That is, in some implementations, the testing module 154 may involve user input to determine what interactions with the application 302' are carried out as part of the testing procedure. Some implementations may allow a user to interact with an interface associated with the application 302', recording the user's input and the application's responses to the input/output record 306. However, the range of interaction options for the user may be more limited in the test environment 304 than when the un-instrumented application 302 runs normally, and some responses (such as network signals) may be interrupted and simulated as part of the testing procedure.

At the conclusion of the test, the testing module 154 generates a testing profile 310 that includes the data gathered by the input/output record 306 and file and memory monitor 308. This data is sent, along with the original application 302 itself, to the cloud-based obfuscation module 156. A code obfuscator 322 uses the sent data (including both the application code and any relevant details from the testing profile) to produce an application 302" with obfuscated code. In some implementations, the obfuscation module 156 may be able to take measures when the code obfuscator 322 is first run to preserve the functionality of the resulting application based on the testing profile 310—that is, records associated with the testing profile 310 may be used by the obfuscator 322 to modify its code obfuscation procedure in some way to avoid known or common problems. In some implementations, the code obfuscator 322 may not take the testing profile data into account until a problem is uncovered by the cloud-based testing module 158, as further described.

The obfuscated application 302" is run by a cloud-based testing module 158 associated with the obfuscation module 156. It will be understood that the cloud-based testing module 158 may differ from the client testing module 154 in a number of ways. The two modules may, in some cases, be entirely separate and may not even share significant source code. The functionality of modules may therefore be entirely different.

In some implementations, the cloud-based testing module 158 may not include a set of preset testing parameters or any option for manual testing or other user intervention. Instead, the functions performed in the testing environment 314 on the obfuscated application 302" may be guided primarily by the testing profile 310. Specifically, where the testing profile 310 records a series of inputs and instructions that resulted in certain outputs and certain file/memory events, the cloud-based testing module 158 may primarily re-create the recorded inputs and instructions. An input/output validator module 316 may, rather than attempting to record the inputs and outputs of the test, compare the outputs received for various inputs and verify that they conform to the testing profile data for the application before obfuscation. Similarly, the file/memory validator 318 may mainly be tasked to make sure that changes to the files and system memory match the profile data and the record produced by the monitor 308 for the un-obfuscated application. Where the application 302" is instrumented as part of the testing and validation procedure for the testing module 158, the instrumentation may rely on the record of the original instrumentation of the application code by the instrumentation module 320 and may be performed in a parallel manner.

Figure 4:
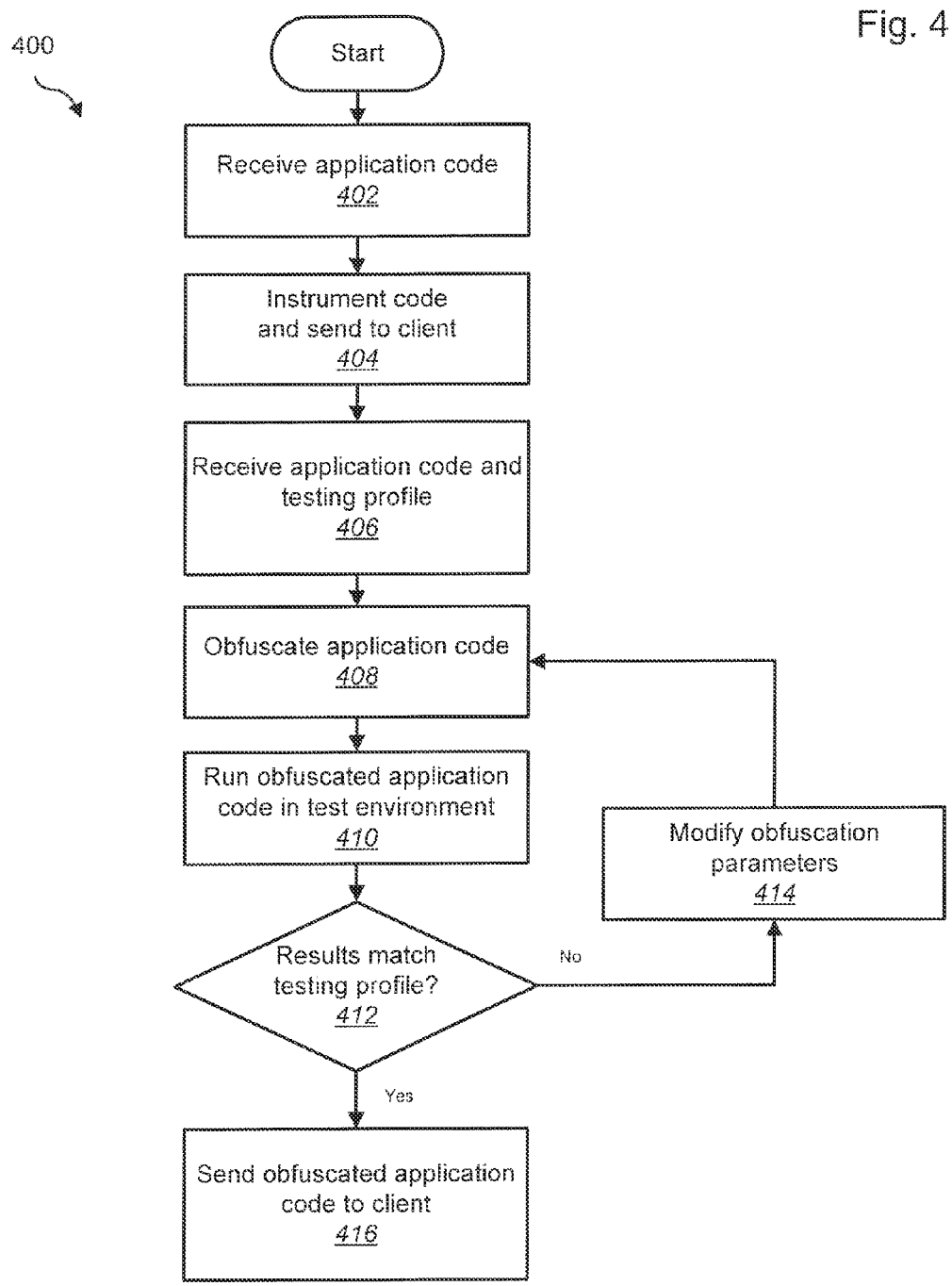
FIG. 4 shows a method for application code obfuscation in accordance with an embodiment of the present disclosure.

FIG. 4 illustrates a method 400 for remote obfuscation in accordance with some embodiments of the disclosure. It will be understood that a variety of methods are possible within the scope of what has been described, and the following method 400 is given for illustrative purposes only. The steps described may be performed by any appropriate cloud-based system such as a cloud-based obfuscation module 156 as described above.

The cloud-based system receives initial application code (402), instruments the code, and returns it to the client for initial testing (404). The code instrumentation may be tailored to various aspects of the application code. The instrumentation may be provided based on some indication from the client as to the nature of the client' testing environment.

The application code is received along with a testing profile for the application (406). The testing profile may involve testing data assembled automatically or manually through any appropriate system (such as a testing module 154 as described above). In some implementations, what is included in the test profile may depend primarily or entirely on the owner of the application; developers with more concerns about the fragility of their product may be inclined to include a more detailed and comprehensive set of test data.

Based on the received application code and testing profile, the application is processed to produce obfuscated code (408). Obfuscation procedures may be dependent on language and/or projected runtime environment and may, in some implications, take into account the testing profile, such as avoiding certain obfuscation procedures on certain parts of the code. The result of the obfuscation procedure is obfuscated application code which is still executable, but is significantly more difficult to reverse engineer.

The cloud-based system then runs the application code in a test environment (410). In some implementations, the simulated inputs and instructions used in the test environment are based on the testing profile, which guides the cloud-based module in what inputs and configurations need to be tested.

The results of testing are compared against the testing profile (412). If there are discrepancies, then the cloud-based system makes adjustments to the obfuscation procedure (414). This may involve, in some implementations, selectively refraining from obfuscating certain specific aspects of the application code which are identified as associated with certain testing results. In some implementations, alternative obfuscation schemes may be attempted as trial-and-error until a scheme successfully obfuscates the application without affecting the testing results.

Each of these steps are performed within a self-contained, automated system such as a cloud-based computing environment. When the application code is successfully obfuscated while preserving the testing results, the obfuscated application code is sent back to the client requesting the obfuscation (416).

Although not explicitly shown on the flowchart of FIG. 4, some implementations of the process may include a failure state. That is, if the automated modifications of the obfuscation parameters do not produce success, after some number of iterations, the obfuscated code along with the testing results may be sent to the client anyway with a message expressing that the obfuscation was not successful. In some implementations, further information may be requested by the cloud-based system in order to allow for an improved obfuscation method that preserves the testing results. In other embodiments, the cloud-based system may merely provide a failure message when repeated modification of obfuscation parameters fail to produce successfully-tested At this point it should be noted that techniques for code obfuscation in accordance with the present disclosure as described above may involve the processing of input data and the generation of output data to some extent. This input data processing and output data generation may be implemented in hardware or software. For example, specific electronic components may be employed in testing modules, obfuscation modules, or similar or related circuitry for implementing the functions associated with application code obfuscation in accordance with the present disclosure as described above. Alternatively, one or more processors operating in accordance with instructions may implement the functions associated with application code obfuscation in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer-implemented method for remote obfuscation comprising:
   receiving, by a remote tamper protection service from a customer, application code of the customer and testing data associated with the application code, the testing data including records of inputs supplied to an instrumented version of the application and corresponding recorded outputs results matched to recorded inputs generated during execution of the instrumented version of the application by the customer;
   generating, by the remote tamper protection service, obfuscated application code from the received application code;
   testing, by the remote tamper protection service, the obfuscated application code by running the obfuscated application code, using the inputs from the testing data, and recording associated outputs;
   in response to determining that the associated outputs do not match the recorded outputs, the remote tamper protection service repeatedly performing without involving the customer:
      modifying the obfuscated application code by changing obfuscations within the obfuscation application code; and
      automatically retesting the obfuscated application code as modified against the testing data; and
   in response to determining that outputs from automatically testing the modified obfuscated application code match the recorded output results, the remote tamper protection service transmitting the modified obfuscated application code as a successful obfuscation of the application to the customer via a communication network.

2. The method of claim 1, further comprising:
   prior to receiving the testing data, the tamper protection service:
      instrumenting the received application code to produce an instrumented version of the application code; and
      providing the instrumented version of the application code to the customer.

3. The method of claim 1, further comprising:
   prior to receiving the testing data, transmitting, by the remote tamper protection service to the customer, an instrumentation tool configured to add instrumentation to the application code for monitoring the application code during testing.

4. The method of claim 1, wherein the tamper protection service is a cloud based service.

5. The method of claim 1, wherein modifying the obfuscated application code includes:
   selectively identifying a portion of the obfuscated application code associated with an output that did not match during testing; and
   modifying the identified portion of the obfuscated application code so that it is no longer obfuscated.

6. The method of claim 1, wherein the testing data includes at least one of a creation, deletion, or modification of files present in system memory, and wherein testing the obfuscated application code further includes matching said creation, deletion, or modification of files included in the testing data with said inputs and said associated outputs.

7. An article of manufacture comprising:
   at least one non-transitory processor readable storage medium; and
   instructions stored on the at least one medium;
   wherein the instructions are configured to be readable from the at least one medium by at least one processor and thereby cause the at least one processor to operate so as to:
      receive, by a remote tamper protection service from a customer, application code of the customer and testing data associated with the application code, the testing data including records of inputs supplied to an instrumented version of the application and corresponding recorded outputs results matched to recorded inputs generated during execution of the instrumented version of the application by the customer;
      generate, by the remote tamper protection service, obfuscated application code from the received application code;
      test, by the remote tamper protection service, the obfuscated application code by running the obfuscated application code, using the inputs from the testing data, and recording associated outputs;
      in response to determining that the associated outputs do not match the recorded outputs, the remote tamper protection service repeatedly perform without involving the customer:
         modifying the obfuscated application code by changing obfuscations within the obfuscation application code; and
         automatically retesting the obfuscated application code as modified against the testing data; and
      in response to determining that outputs from automatically testing the modified obfuscated application code match the recorded output results, cause the remote tamper protection service to transmit the modified obfuscated application code as a successful obfuscation of the application to the customer via a communication network.

8. The article of claim 7, wherein prior to receiving the testing data, the remote tamper protection service providing an instrumentation tool to customer to add instrumentation to the application code for monitoring the application code during testing.

9. The article of claim 7, wherein the at least one processor is further operable to, prior to receiving the testing data, cause the tamper protection service to instrument the received application code and provide the instrumented version of the application code to the customer.

10. The article of claim 7, wherein the tamper protection service is a cloud based service.

11. The article of claim 7, wherein modifying the obfuscated application code includes:
selectively identifying a portion of the obfuscated application code associated with an output that did not match during testing; and
modifying the identified portion of the obfuscated application code so that it is no longer obfuscated.

12. The article of claim 7, wherein the testing data includes at least one of a creation, deletion, or modification of files present in system memory, and wherein testing the obfuscated application code further includes matching said creation, deletion, or modification of files included in the testing data with said inputs and said associated outputs.

13. A system for remote obfuscation comprising:
a customer computing device; and
a remote tamper protection service coupled to the customer computing device via a computing network;
wherein the customer computing device is configured to convey to the remote tamper protection service application code of the customer and testing data associated with the application code, the testing data including records of inputs supplied to an instrumented version of the application and corresponding recorded outputs results matched to recorded inputs generated during execution of the instrumented version of the application by the customer;
wherein the remote tamper protection service is configured to:
receive the application code and testing data via a computing network;
generate obfuscated application code from the received application code test the obfuscated application code by running the obfuscated application code, using the inputs from the testing data, and recording associated outputs;
in response to determining that the associated outputs do not match the recorded outputs, the remote tamper protection service repeatedly performing without involving the customer:
modifying the obfuscated application code by changing obfuscations within the obfuscation application code; and
automatically retesting the obfuscated application code as modified against the testing data; and
in response to determining that outputs from automatically testing the modified obfuscated application code match the recorded output results, the remote tamper protection service is configured to transmit the modified obfuscated application code as a successful obfuscation of the application to the customer via the communication network.

14. The system of claim 13, wherein the remote tamper protection service is a cloud based service.

15. The system of claim 13, wherein the remote tamper protection service is further configured to, prior to receiving the testing data, transmit an instrumentation tool configured to add instrumentation to the application code for monitoring the application code during testing.

16. The system of claim 13, wherein tamper protection service is a cloud based service.

17. The system of claim 13, wherein modifying the obfuscated application code includes:
selectively identifying a portion of the obfuscated application code associated with an output that did not match during testing; and
modifying the identified portion of the obfuscated application code so that it is no longer obfuscated.

18. The system of claim 13, wherein the testing data includes at least one of a creation, deletion, or modification of files present in system memory, and wherein testing the obfuscated application code further includes matching said creation, deletion, or modification of files included in the testing data with said inputs and said associated outputs.

* * * * *